June 19, 1934.  J. DAVIES  1,963,695
PRODUCTION OF PICTURES IN COLORS
Filed Feb. 11, 1933
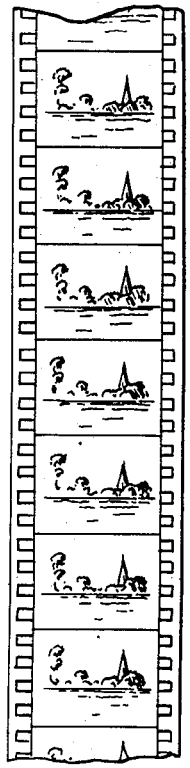
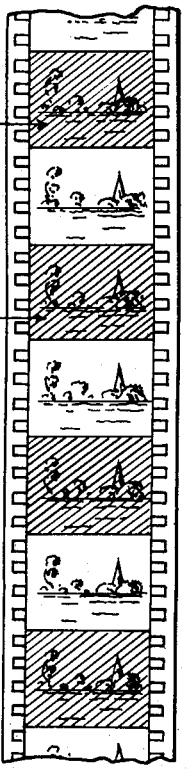
Inventor
John Davies
By his Attorney
A.J. Davies Patented June 19, 1934

1,963,695

UNITED STATES PATENT OFFICE 1,963,695

PRODUCTION OF PICTURES IN COLORS

John Davies, Bootle, Liverpool, England

Application February 11, 1933, Serial No. 656,385
In Great Britain February 10, 1932

6 Claims. (Cl. 88—16.4)

This invention relates to an improved method of producing pictures in colors by projection in a cinematograph apparatus, magic lantern or like apparatus. In previous methods of projecting cinematographic pictures by the so called additive method whereby they appear in natural colors, a composite film has been prepared embodying groups of two or more color component pictures taken through color filters, such as for example red and green filters, the component pictures being afterwards projected through filters of the same colors as those employed when the film was taken, the two component pictures being projected either simultaneously in groups or consecutively and being superimposed upon the showing screen. The use of filters for screen projection of the same colors as those employed in the taking process leads, however, to a great reduction of brilliance and lack of color values in the resulting screen pictures, for instance blues and yellows cannot be produced at all satisfactorily by such means. In other methods the component pictures have been simultaneously projected one through a filter of like color to that through which it was taken and the other without the interposition of a filter. A method has also been proposed which consists in treating the red component pictures of a cinematographic film with a red dye and the green component pictures with a green dye. The green dye does not, however, shut out light of undesirably short wave length.

Fig. 1 shows a film that has been treated with aesculine or β-naphtholdisulphonic acid.

Fig. 2 shows the film with alternate pictures stained or tinted red.

The invention is particularly applicable to cinematography and in such application, according to this invention a cinematograph film negative is first produced, the pictures on which are preferably taken consecutively in the usual way but alternately through filters of different color, say red and green respectively or other complementary colors, on a panchromatic film. While only two component filtered pictures are necessary in each group, three or more color filters may be used through which three or more corresponding component pictures may be taken in each group. The negative is then developed in known manner. A positive film is then made from the negative and also developed in known manner and the whole film, preferably, is then treated in a solution of aesculine or β-naphtholdisulphonic acid to which may be added rose bengale and patent blue. A trace of ammonia may also be added. The aesculine or β-naphtholdisulphonic acid produces on the pictures to which it is applied a filter allowing a complementary color of light of the shorter wave length to pass through and shutting out light of undesirably short wave length. The film after being treated in the solution is dried and the pictures projected on to a screen, the component pictures being projected in a manner such that those pictures originally taken say through a red filter are now projected either through a separate red filter, the movement of which synchronizes such filter only with the red component pictures, or such red filter may be embodied on the film itself, a suitable red stain or dye being for this purpose applied only over the red component pictures. Each group of component pictures, such as those taken through red and green filters, is projected preferably simultaneously in pairs or other multiple groups and the images from all the components caused to be accurately superimposed upon the screen in any suitable manner, say by means of a prism or other reflecting system, the single resulting picture appearing on the screen in natural colors. As mentioned each consecutive picture is taken in individual sequence on the film and the pictures may also be projected similarly in individual sequence but a simultaneous group projection gives a better result and when projected in this latter way the gate of the projector is enlarged to accommodate each successive pair or group of component pictures being projected simultaneously.

The treatment of the whole film in the solution imparts a slightly bluish tint, the effect of which is that of a color filter applied to the film, which may for convenience be referred to as the solution filter. When therefore, the pictures are subsequently projected, the red component pictures are shown through a red filter either separate or embodied on the film and a solution filter embodied on the film and the green component pictures only through a filter embodied on the film, the color of which has been derived from the solution. Instead however of treating the whole film in the solution only those component pictures originally taken through the green filter may be so treated.

While this embodiment of the solution filter on the film itself is the most desirable method of using the latter filter a solution filter separate from and independent of the film may be provided prepared by treatment in the solution as before described, such separate solution filter being so disposed and operated that it shall be caused to co-act either with both the red and green component pictures or only with those pictures originally taken through the green filter. It will be understood therefore that the red projection filter may be either separate or embodied on the film and similarly the solution filter may be either separate or embodied on the film, each pair of component pictures being projected simultaneously and superimposed upon the showing screen, the resulting picture appearing in the true natural colors of the objects from which the film has been taken.

The bath in which the positive film is treated is made up of a solution of æsculine or β-naphtholdisulphonic acid in water or preferably methylated spirit in the proportion of about 1 part of æsculine or β-naphtholdisulphonic acid in 1000 parts of water or spirit. If desired about 1 part of rose bengale and patent blue may be added to the solution of either æsculine or β-naphtholdisulphonic acid.

The color of the red projecting filter, whether used separately or as a red dye or tint applied to the red component pictures on the film, is of a character such that the filter will absorb or eliminate all the colors of the spectrum band ranging from a point corresponding to a .000625 millimetre wave length to the violet end of the spectrum. The red color of the separate red projecting filter or the red dye or stain applied to the film may be made "fast" or immune against any deleterious action of the light used in projection by adding a proportion of copper or nickel sulphate to the coloring medium used.

While very good results have been obtained with pictures taken through red and green filters, satisfactory component pictures may also be obtained taken through filters of other complementary colors and while only two color filters producing pairs of component color pictures are found to be quite sufficient and simplify the process and apparatus the process may be extended by utilizing three or more color filters to produce groups of three or more component pictures.

Where filters of complementary colors other than red and green are used in taking a negative, for instance blue-violet and yellow filters, the positive pictures printed therefrom are projected in a manner similar to that described, namely, the blue-violet component pictures through a blue-violet and æsculine filter or through a blue-violet filter alone and the yellow component pictures through an æsculine filter alone.

With a process as described of producing a film and projecting color pictures therefrom a greater brilliancy and more varied range of color values is obtained than has been hitherto achieved by any of the methods previously proposed.

Although the method described is particularly suitable for cinematography it is of course otherwise applicable for the projection of still colored pictures.

I claim:

1. A method for producing a positive film for the projection of cinematographic pictures in natural colors which consists in producing a positive film bearing groups of two color separated picture image sections by printing it from a negative film taken through two complementarily colored filters so that said negative film bears groups of two color separated picture image sections, treating the whole positive film so prepared with a solution of æsculine and thereby embodying on the film a light filter comprising æsculine, and thereafter applying over each one of the groups of component picture images on the positive film corresponding to the complementary color of light of the longer wave length a solution of a suitable dyestuff such that it forms for each one of the groups aforementioned of component picture images on the positive film corresponding to the complementary color of light of the longer wave length a color filter embodied on the film that allows only light of the said complementary color of light of the longer wave length to pass through.

2. A method as in claim 1, in which the whole positive film is first treated with a solution of æsculine, rose bengale and patent blue.

3. A method as in claim 1, in which the whole positive film is first treated with a solution of æsculine, rose bengale, patent blue and a trace of ammonia.

4. A method for producing a positive film for the projection of cinematographic pictures in natural colors which consists in producing a positive film bearing groups of two color separated picture image sections, by printing it from a negative film taken through red and green filters so that said negative film bears groups of two color separated picture image sections, treating the whole positive film so prepared with a solution of æsculine and thereby embodying on the film a light filter comprising æsculine, and thereafter applying over each one of the groups of component picture images on the positive film corresponding to the light of red color a solution of a red dyestuff and thereby forming for each one of the groups aforementioned a red color filter embodied on the film.

5. A method as in claim 4, in which the whole positive film is first treated with a solution of æsculine, rose bengale and patent blue.

6. A method as in claim 4, in which the whole positive film is first treated with a solution of æsculine, rose bengale, patent blue and a trace of ammonia.

JOHN DAVIES.